United States Patent [19]

Hart

[11] 4,038,911
[45] Aug. 2, 1977

[54] MULTI-DIRECTIONAL VENT

[75] Inventor: Arthur C. Hart, Buena Park, Calif.

[73] Assignee: Elixir Industries, Gardena, Calif.

[21] Appl. No.: 644,607

[22] Filed: Dec. 29, 1975

[51] Int. Cl.² .............................................. B60H 1/26
[52] U.S. Cl. ................................... 98/2.14; 98/42 R; 49/52; 49/342
[58] Field of Search ................ 98/2.14, 20, 42 R, 78; 296/137 R, 137 J, 137 B; 49/52, 169, 171, 342; 160/180, 91, 95; 52/198, 199, 200

[56] References Cited

U.S. PATENT DOCUMENTS

| 1,592,841 | 7/1926 | Ansell | 98/2.14 |
|---|---|---|---|
| 1,955,088 | 4/1934 | Pine et al. | 49/52 |
| 2,372,164 | 3/1945 | Woodhams | 98/2.14 |
| 2,810,334 | 10/1957 | Perks et al. | 98/42 |
| 2,939,375 | 6/1960 | Herman | 98/2.14 |
| 3,190,689 | 6/1965 | Calthorpe | 296/137 B |
| 3,934,383 | 1/1976 | Perry et al. | 49/342 |

Primary Examiner—John J. Camby
Assistant Examiner—Henry C. Yuen
Attorney, Agent, or Firm—Gausewitz, Carr & Rothenberg

[57] ABSTRACT

A multi-directional vent for the ventilation opening of a vehicle includes a vent frame having a vent cover pivoted at its front side to the frame and having an air intake opening in the front of the vent cover. A door is pivoted to the vent cover to selectively close or open the vent cover intake opening. Gear and bell crank operators are provided to pivot the cover about its hinge connection to the frame and to pivot the door about its hinge connection to the cover. The frame is screened and the operators extend through the screen to enable operation from inside the vehicle. With the door open and the vent cover closed a conventional scoop type operation is provided. With the door closed and the vent cover open a conventional pivoted ventilation operation is provided. With both the door and vent cover open ventilation is provided in all directions when the vehicle is at rest, and when in motion a venturi effect is achieved to extract air from the interior of the vehicle.

20 Claims, 7 Drawing Figures

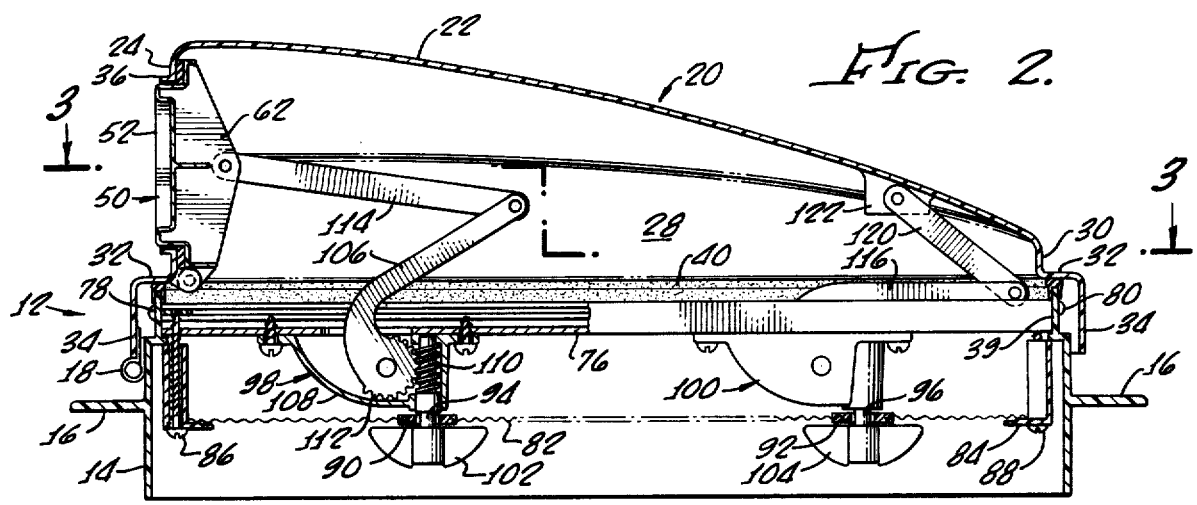

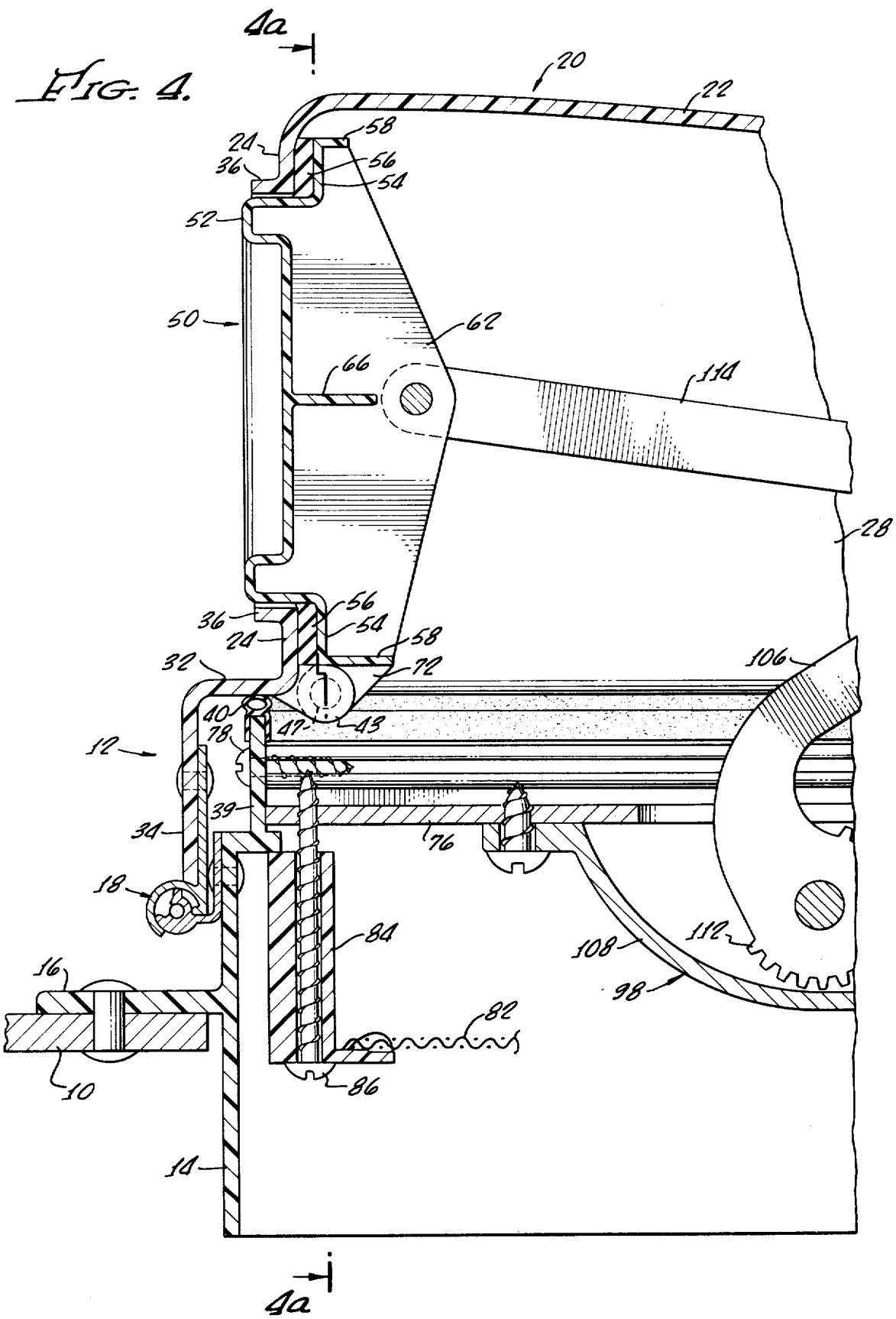

MULTI-DIRECTIONAL VENT

BACKGROUND OF THE INVENTION

1. Field of the Invention

This invention relates to ventilation of vehicles.

2. Description of the Prior Art

Recreational vehicles such as campers, trailers, motor vans, motor coaches and the like, are commonly provided with ventilation devices to provide for interior ventilation both during vehicle motion and when the vehicle is at rest. For ventilation during vehicle motion there is commonly employed a streamlined body in the form of a scoop fixed to the exterior of the vehicle, to the side or to the roof, with a forwardly facing opening through which air is forced into the vehicle during motion. Although this arrangement is effective for forcing air into the vehicle, it is of relatively little use when the vehicle is stopped and will not afford effective ventilation except when the prevailing wind happens to be directed into the scoop opening. Furthermore, it is difficult to seal such vents against water that may be forcibly driven through the opening during vehicle motion. The latches commonly employed to help close scoop openings are so positioned as to require a great force for effective sealing at the door edges. So large a force must be exerted to close the latch such a scoop door that it is difficult, and impossible at times, to properly close the door.

The common pivot vent cover provides little effective ventilation during vehicle motion because this cover must be pivoted at its front edge to avoid excessive wind forces that would tend to damage the cover during vehicle motion. When the vehicle is at rest, such a vent cover provides ventilation at three sides but cannot take advantage of wind directed at the front of the device.

Arrangements are known in which a vent cover is vertically movable and may be entirely displaced from the vent opening or may be raised at its forward or rear edge alone. Such devices are effective and do provide multi-directional venting but they are complex and expensive to manufacture, often costing as much as twice as much as the common pivoted vent cover.

Accordingly, it is an object of the present invention to provide an effective multi-directional vent which avoids or minimizes the above-mentioned problems.

SUMMARY OF THE INVENTION

In carrying out principles of the present invention accordance with the preferred embodiment thereof, a vent cover having at least a front and side walls, is moveably mounted to a ventilation frame and a door is pivoted to the cover to close an opening that is formed in the cover front wall. Means are provided for holding both the door and the cover in selected positions of their motion relative to the cover and to the frame respectively. According to a feature of the invention, an operating mechanism is provided to exert a balanced driving force upon the door to firmly position the door in its closed position within the cover opening to provide an effective yet readily positioned door seal. According to another feature of the invention, the cover is pivoted to the frame at a forward portion of the cover to provide ventilation at three sides of the cover, with the door providing ventilation on the fourth side, and both the door and cover are driven through their pivotal motions by conveniently operable actuator mechanisms.

BRIEF DESCRIPTION OF THE DRAWINGS

FIG. 2 is a vertical sectional view of the assembly of FIG. 1, FIG. 4 is an enlarged sectional detail showing the pivot arrangement of cover and door, FIG. 5 is a sectional view similar to that of FIG. 3 but showing the cover in closed position and the door in open position, and FIG. 6 is a view similar to FIG. 3 showing both the door and cover in open position.

DESCRIPTION OF THE PREFERRED EMBODIMENT

Figure 1:
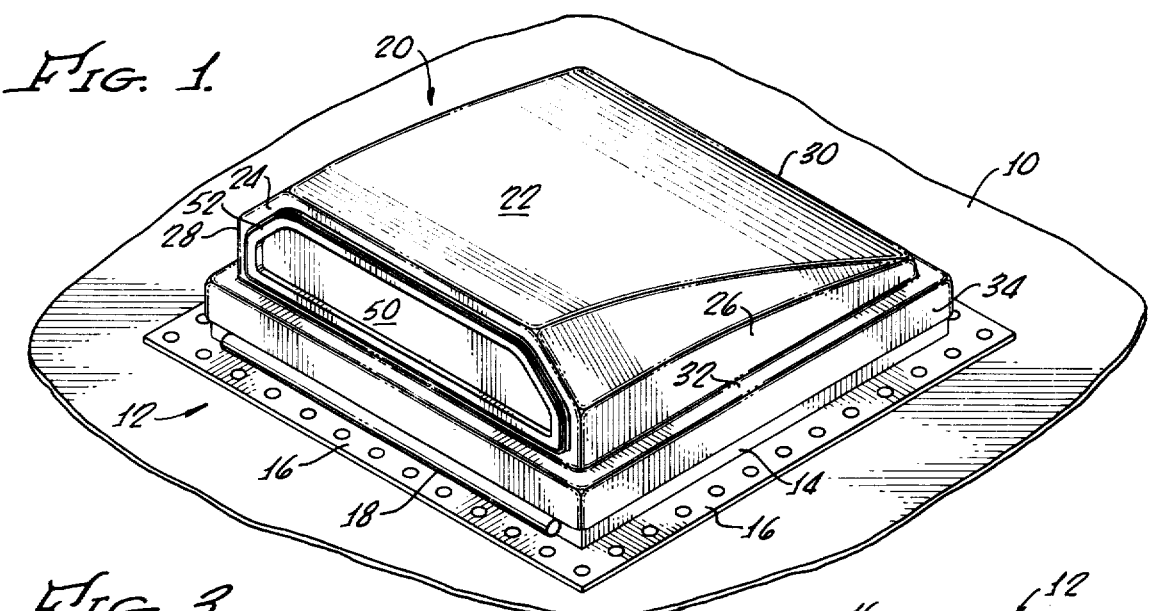
FIG. 1 is a perspective view of a ventilation assembly embodying principles of the present invention.
Figure 3:
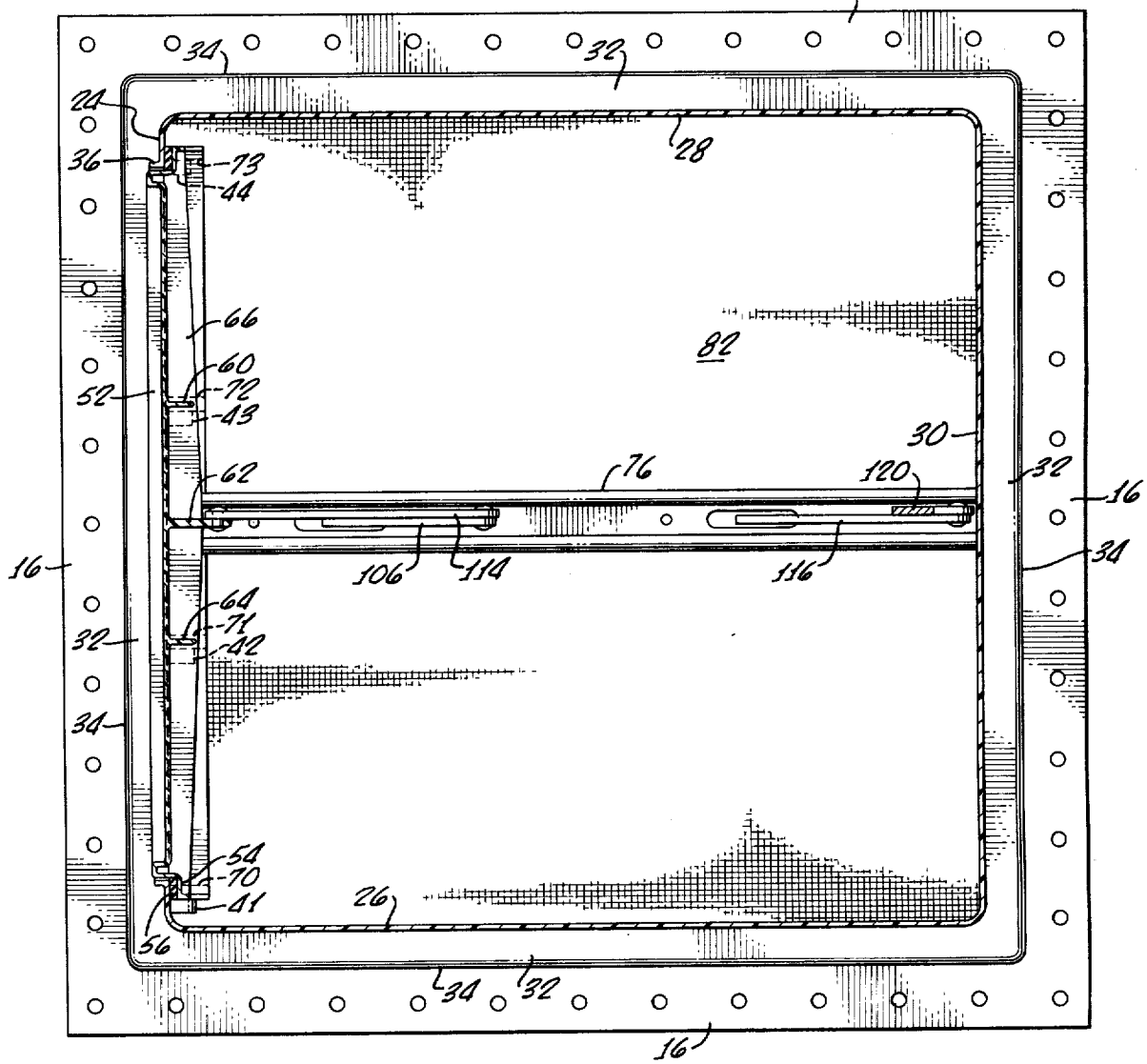
FIG. 3 is a horizontal section taken on lines 3—3 of FIG. 2.
Figure 4A:
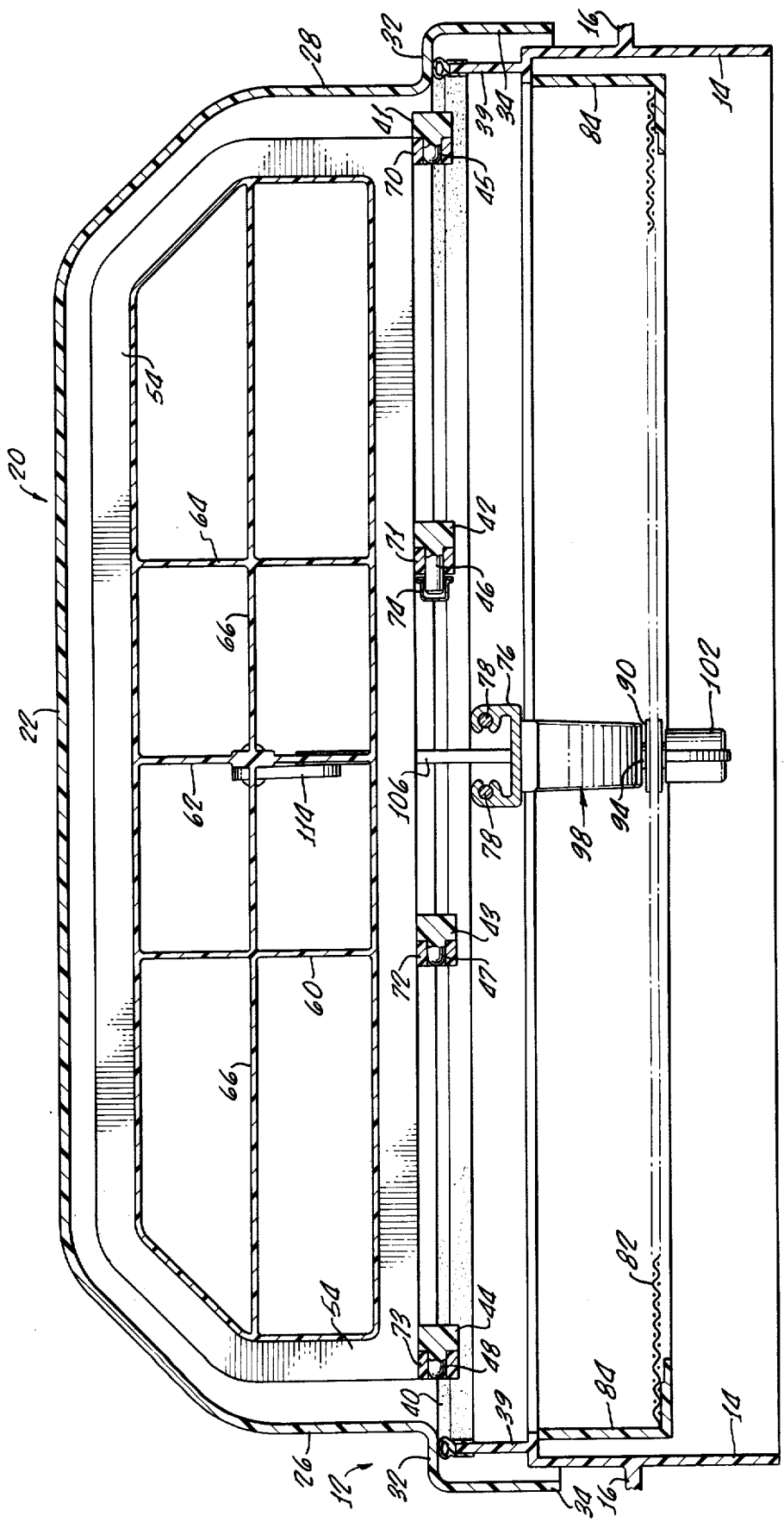
FIG. 4a is a detailed view of the door hinging.

As illustrated in FIG. 1, a vent assembly is provided to be received into an opening of a mobile vehicle, shelter, or the like. The vehicle conventionally has a structural wall member or roof 10 in which is cut an opening adapted to receive the vent asssembly 12. Although the size and shape of the opening and mating vent assembly can be varied according to particular requirements or designs, it is most common to make devices of this type of rectangular or more particularly of a square configuration, and such an arrangement is illustrated in the drawings. The vent frame assembly includes a square vent frame having a peripheral wall 14 (FIGS. 3 and 4) and a peripheral securing and sealing flange 16 by means of which the vent assembly is secured to the structural wall member 10. Fastening means such as screws, nails, rivets or the like extend through the securing flange 16 to fixedly attach the vent assembly in conventional fashion to the structural wall member of the vehicle.

Pivotally mounted to the vent frame by a continuous hinge 18, which extends nearly the full width of the frame, is a vent cover or scoop 20 having a primary cover element 22, a front wall 24 and side walls 26, 28. The primary cover element and side walls collectively define a somewhat streamlined configuration, tapering downwardly to the rear toward a relatively short rear wall 30 with all of the front, rear and side walls merging into a continuous horizontal peripheral cover shoulder 32 which terminates in a continuous peripheral depending flange 34.

As best seen in FIGS. 1 and 4, the front wall 24 of the cover is provided with a cover opening extending over most of the area of this wall, which opening is circumscribed and reinforced by a forwardly projecting continuous flange 36.

The cover is preferably integrally formed, as by injection molding, of a suitable transparent or translucent material, preferably a substantially rigid plastic such as butyrate polyethylene or a tenite butyrate, and may have a thickness of about 0.070 inches. Other materials of different thickness, transparency, translucency may be employed as deemed necessary or desirable.

The cover is movable about its hinge 18 to the closed position illustrated in FIGS. 2 and 4 and also to the open position illustrated in FIG. 6. In the closed position in FIGS. 2 and 4 cover shoulder 32 seats and seals upon a continuous resilient sealing strip 40 that is mounted upon an upstanding peripheral flange 39 integrally formed with the ventilation frame. The frame, like the cover, is formed as by injection molding and from a similar material. The elements of the hinge 18 may be either separately formed and fixedly secured to the cover and frame as illustrated in the drawing or may be molded integrally therewith if deemed necessary or desirable.

Also molded integrally with the cover and projecting downwardly and inwardly from the juction of front wall 24 and shoulder 32 are a number (four are shown in this embodiment) of fixed pivot arms 41, 42, 43 and 44 (FIG. 4a) each having a relatively short laterally projecting hinge pin 45, 46, 47 and 48 fixed thereto or integral therewith. Pin 46 is longer than the other pins for reasons to be described below.

A door 50 is pivoted to the front wall 24 of the cover to close the cover opening. Door 50 includes an integrally formed peripheral lip 52 that projects into the cover opening adjacent opening flange 36 when the door is in closed position, and also includes a peripheral flange 54 that projects outwardly of the door lip 52 from the inner end of this lip. Secured to the forward face of the peripheral flange 54 is a continuous sealing gasket 56 that is forcibly compressed between the door and the front wall of the cover when the door is moved to its closed position.

Because large forces are applied to the door and evenly distributed over the door and its perimeter, the flange 54 has rearwardly projecting reinforcing portions 58, extending peripherally about the door, and a number of reinforcing ribs 60, 62 and 64 (FIG. 4a) project rearwardly from the plane of the door and extend vertically across the face of the door. A transverse reinforcing rib 66 extends horizontally across the rear face of the door, projecting rearwardly therefrom and fixed to ribs 60, 62, 64. Rib 62 extends further rearwardly than the other ribs and is centrally located with respect to the door so that a force applied to a central portion of the rib 62 will be transmitted as a set of balanced and evenly distributed forces over substantially all of the area of the door and its perimeter. Thus a force applied to the center of the rib 62 will achieve a substantially uniform distribution of pressure to compress the gasket 56 between the periphery of the door and the periphery of the cover opening.

Integrally formed with the door and extending downwardly and forwardly from the lower portion of door flange 58 are a number of door hinge arms 70, 71, 72 and 73 which are positioned and apertured to receive the respective hinge pins 45, 46, 47 and 48. A conventional fastening device such as a spring drive nut 74 is secured to the free end of the longer hinge pin 46, after assembly of the door upon the hinge pins, to retain the door upon its hinge. The elongated pin 46 also assists in assembly of the door upon its pins since this pin may be first located within the aperture of the door hinge arm 71 to facilitate alignment and positioning of the shorter pins within the respective hinge arm apertures.

A rigid structural channel shaped extrusion provides a support element 76 that extends across the center of the frame and is secured to the front and back of the frame by suitable means such as screws 78, 80 that threadedly engage apertures extending the length of the upper edges of the channel walls. A screen 82 is secured to a screen frame 84 that is screwed or otherwise detachably connected to the channel 76 by means of long fastening elements such as screws 86, 88, extending through central portions at the front and rear of the screen frame 84 and threaded into front and rear portions of the channel 76. The screen is formed with a pair of spaced and reinforced apertures 90, 92 which receive operating shafts 94, 96 of substantially conventional gear and bell crank actuating and positioning mechanisms 98, 100 that are fixed to the underside of the structural support member 76. Operating shafts 94, 96 have operating handles 102, 104 respectively secured thereto in detachable but nonrotational relation. Actuating mechanism 98 comprises a bell crank 106 pivoted to a housing 108 that is fixed to the support member 76. A worm gear 110 is journaled in the housing to mesh with gear teeth 112 formed on one end of the bell crank 106 and carries the operating shaft 94. A door driving link 114 is pivoted at one end to an end of bell crank 106 and at its other end to a central and rear portion of the reinforcing rib 62.

Actuating mechanism 100 is substantially identical to the mechanism 98 and includes a bell crank 116 substantially similar to bell crank 106, driven by means of gearing (not shown) from the operating shaft 96. A cover driving link 120 is pivoted at one end to an end of the bell crank 116 and at its other end to a pivot lug 122 that is integrally formed on the inner surface of the primary cover element 22 at a substantially central portion of the rear of the cover.

When the described vent assembly is completely closed, bell crank 116 of operating mechanism 100 is completely retracted, in its position of maximum clockwise rotation, as viewed in FIG. 2, whereby the driving link 120 exerts a downward force upon the rear end of cover 22 to firmly press the shoulder 32 down upon the sealing strip 40 throughout the entire periphery of the frame. In this completely closed position bell crank 106 is extended in a position of near maximum counter-clockwise rotation, as viewed in FIG. 2, and driving link 114 is pressed forwardly to a maximum extent to provide a strong forwardly directed centrally positioned and balanced force upon the door 50, whereby the door is tightly sealed against the front wall of the cover to tightly seal the front opening of the cover. This fully closed position of both cover and door is illustrated in FIG. 2.

FIG. 5 shows the vent assembly with the cover closed, as in the position illustrated in FIG. 2, but with the door moved to a position displaced from the cover opening. Handle 102 has been rotated to pivot bell crank 106 in a clockwise direction thereby retracting link 106 and pulling the door to cause it to pivot in a clockwise direction around its pivotal connection to the front wall of the cover. The position of FIG. 5 normally will be employed with the vehicle in motion so as to force air through the cover opening into the vehicle as the vehicle moves forwardly, to the left as shown in FIG. 5. Air movement is indicated by the arrows of FIG. 5.

For full or multi-directed venting the cover is tilted forwardly and upwardly about its pivot and the door is displaced inwardly to position the assembly as illustrated in FIG. 6. Thus the cover actuating mechanism is rotated to pivot bell crank 116 in a counterclockwise direction and force the driving link 120 to raise the cover 22, pivoting the latter in a counterclockwise direction about its pivotal connection to the frame. The door is opened as described in connection with FIG. 5. Thus moving air approaching the vent assembly from any direction is able to enter the vent and the vehicle when the vehicle is stationary.

The full venting position of FIG. 6 is also used when the vehicle is moving and provides a surprising and unexpected result. In this condition of the vent assembly, air is actually extracted from the interior of the vehicle, flowing as indicated by the arrows of FIG. 6. As the vehicle moves to the left air flows inwardly through the unobstructed vent cover opening, then across the vent frame and outwardly from the vent between the rear of the frame and the raised rear of the vent cover. This air flow creates a venturi effect. This venturi effect is enhanced by the configuration of the vent cover and the titled position of the door which provides a type of funnel shaped air intake and a restructed area of air flow. The restricted air flow area causes an increased velocity of air flow and concomitantly a decreased pressure to achieve the venturi effect. The decreased pressure which occurs above the frame and below the vent cover causes air to flow from the interior of the vehicle upwardly and outwardly through the vent frame and then outwardly to the rear of the open vent cover.

Not illustrated in the drawings is a fourth configuration which the described vent assembly can assume in which the door is closed but the vent cover is open having been pivoted in a counterclockwise direction about its hinge 18.

It will be understood that because both of the actuating or driving mechanisms, both that for the door and that for the vent cover, are connected to the fixed support member 76, it is essential that the door be open before the vent cover can be closed. More specifically, to close the door with the vent cover raised the door must move forwardly, pivoting counterclockwise (as viewed in FIG. 6) beyond a vertical position so that it lies in the plane of the now inclined vent opening of the vent cover. However, with the door held in this position by the actuating and positioning mechanism 98, the cover cannot be closed since to close the cover the front wall of the cover must pivot in a clockwise direction but is restrained from such motion by its engagement with the door.

To avoid this situation one may simply provide a stop on the door actuating mechanism that prevents further counterclockwise rotation of the door beyond the substantially vertical position illustrated in FIG. 2. If this is done, care must be taken to assure that sufficient freedom of motion is retained to enable the door to be pressed tightly against the periphery of the cover opening. Various stop arrangements may be employed. Bell crank 106, just as does the bell crank 116, extends through a slot in the web of the channel shaped support member 76. This slot may be so positioned that when the door is in the position shown in FIG. 2 the bell crank 106 has its forwardly facing edge in direct engagement with the forward edge of the slot in the channel of the support member 76. Thus the support member, or, more specifically an edge of the slot formed therein, will provide a stop that limits forward motion of the door beyond the position illustrated in FIG. 2. In such an arrangement, of course, the door cannot be closed when the cover 22 is opened. However, no such stop is employed in the presently preferred embodiment and one does not close the door when the cover is open, or simply opens the door before closing the cover.

The arrangement of the invention in which the cover is pivoted to the frame, as illustrated in the drawings, is preferred because of ease of operation and economy of manufacture. It will be readily appreciated, however, that the cover may be movably mounted to the frame for motion other than the illustrated pivotal motion. Thus the cover may be mounted to the frame for vertical motion as a unit or for upward tilting of either the front or the back of the cover in various ways such as shown, for example in the U.S. Patent to Hattass et al., U.S. Pat. No. 3,888,165 or the U.S. Patent to Green, U.S. Pat. No. 3,517,303. Further, the door, which is pivoted to the cover to close the front opening therein, may be driven by an actuator connected between the door and the cover itself rather than between the door and the frame mounted support member as shown in the drawings. In such an arrangement, the position of the door will not interfere with motion of the cover and the door and cover may each assume any position independent of the other, although, of course, the door cannot move to a position beyond the front wall of the cover when an inwardly opening door is provided with the illustrated sealing arrangement.

The described bell crank gear and link operating mechanisms are mere exemplary of many different types of mechanisms that may be employed to adjustably position and forceably operate the cover and the door. Thus conventional bell crank and track mechanisms may be employed such as shown in U.S. patent to Kelly U.S. Pat. No. 3,846,938 for example, or in the U.S. Patent to Rapport U.S. Pat. No. 3,587,443. The arrangement illustrated is preferred because it is more economical to manufacture, using less material for the operating mechanism.

Although the door is shown in a preferred arrangement wherein a single centrally positioned driving link is employed to provide a balanced closing force upon the door, it is also contemplated that a pair of driving links, driven in unison from a common torque tube of the operating mechanism, may be employed. The tubes would be attached to mutually opposite sides of the door to provide a balanced force. Other arrangements known and available to those skilled in the art may be employed to obtain such a balanced force. In any event, it is significant that a mechanism be provided which will apply a large balanced force to the door to effect a tight closing and sealing and, further, that such a mechanism be operable from inside of the vehicle. Where a screened vent opening is provided, as shown in the drawings, the mechanism operating handle must be positioned on the side of the screen remote from the door cover for convenience of operation. Thus, where a mechanism is provided to operate the door and connected between the door and a point on the cover rather than on the frame support member 76, such a mechanism would preferably have a long depending handle extending downwardly through an appropriate aperture in the screen.

The door shown is pivoted at the lower portion of the door opening about a substantially horizontal axis. This arrangement is preferred for ease and economy of manufacture. Nevertheless, it will be readily appreciated that the door may be hinged at other portions of the front wall of the cover, at the top or at either side of the opening in the cover, and may also be arranged to pivot outwardly of the cover or forwardly with respect to the vehicle. Obviously suitable change, well within the skill of those familiar with this art, would be made in the operating mechanism to insure a balanced closing force on the door regardless of how it is mounted for motion to and from the cover opening.

Where the operating mechanism employs only a bell crank and a track guiding the free arm of the bell crank (instead of a driving link interconnecting the bell crank and the cover), the cover may preferably be made in a arcuate configuration, with a shoe riding in the track and pivoted to the free arm of the bell crank.

It will be seen that a vent assembly has been described that inexpensively and simply provides for a multidirectional venting by employing a combination of a movable vent cover and an independently movable door in a front wall of the cover, so arranged that adequate venting is available to accept air flowing from any direction. With the vehicle in motion and both the vent and door open there is accomplished the unexpected and surprising exhausting of air from the vehicle interior.

The foregoing detailed description is to be clearly understood as given by way of illustration and example only, the spirit and scope of this invention being limited solely by the appended claims.

What is claimed is:

1. A vent assembly for a vehicle having a ventilation opening formed in a wall thereof, said assembly comprising
   a vent frame adapted to be mounted to said vehicle to frame said opening,
   a vent cover having a primary wall element and at least side and front wall elements extending therefrom, said front wall element having a cover opening formed therein,
   a door mounted to said vent cover for movement to a first position in which said cover opening is closed and sealed by said door and to a second position displaced from said cover opening,
   means for selectively securing said door in at least said first and second positions,
   means for pivotally connecting said vent cover front wall element to said vent frame to permit displacement of the rear and sides of said cover from said frame and provide ventilation passages between said frame and cover at the rear and sides of said cover, and
   means for adjustably positioning said vent cover in different positions of its motion with respect to said vent frame to provide different areas of such ventilation passages.

2. The assembly of claim 1 wherein said door is pivoted to said cover to open inwardly thereof, wherein said door includes a peripheral flange adapted to be urged toward the inner side of said front wall element as said door moves to said first position, and wherein said means for selectively securing said door includes actuator means for exerting a balanced force upon said door to urge said door to said first position with said peripheral flange pressed against said front wall element to thereby seal the cover opening.

3. The assembly of claim 2 wherein said actuator means comprises force distributing means secured to and extending across the inner side of said door, an actuator link connected to a substantially central point of said force distributing means, and means for forcibly driving said actuator link.

4. A vent assembly for a vehicle having a ventilation opening formed in a wall thereof, said assembly comprising
   a vent frame adapted to be mounted to said vehicle to frame said opening,
   a vent cover having a primary wall element and at least side and front wall elements extending therefrom, said front wall element having a cover opening formed therein,
   a door mounted to said vent cover for movement to a first position in which said cover opening is closed and sealed by said door and to a second position displaced from said cover opening,
   means for selectively securing said door in at least said first and second positions,
   means for movably mounting said vent cover to said vent frame,
   means for adjustably positioning said vent cover in different positions of its motion with respect to said vent frame,
   a support member extending across and fixed to said vent frame,
   said means for adjustably positioning said vent cover comprising a first positioning mechanism interconnected between said primary wall element and said support member,
   said means for selectively securing said door comprising a second positioning mechanism interconnected between said door and said support member.

5. The assembly of claim 4 wherein each of said positioning mechanisms comprises a link pivoted to said support member and actuator means mounted to said support member for pivoting said link.

6. The assembly of claim 5 including a screen fixed to said frame inwardly of said support member, said screen having first and second apertures therein, said actuator means of said first and second positioning mechanisms extending through said apertures to points inwardly of said screen whereby said vent cover and door may be adjustably positioned from a location inwardly of said screen.

7. A vent assembly for a vehicle having a ventilation opening formed in a wall thereof, said assembly comprising
   a vent frame adapted to be mounted to said vehicle to frame said opening,
   a vent cover having a primary wall element and at least side and front wall elements extending therefrom, said front wall element having a cover opening formed therein,
   a door mounted to said vent cover for movement to a first position in which said cover opening is closed and sealed by said door and to a second position displaced from said cover opening,
   means for selectively securing said door in at least said first and second positions,
   means for movably mounting said vent cover to said vent frame,
   means for adjustably positioning said vent cover in different positions of its motion with respect to said vent frame,
   said door including a peripheral forwardly extending lip adapted to project into and mate with the opening in said front wall element when said door is in said first position,
   an outwardly extending peripheral flange extending outwardly of said door from an inner portion of said peripheral lip, said flange overlapping portions of said front wall element that circumscribe said cover opening when said door is in said first position, said means for selectively securing said door comprising actuator means for applying a balanced force to said door to forcible drive said door into said first position with said lip projecting into said cover opening and with said peripheral flange urged against said front wall element.

8. The assembly of claim 7 wherein said actuator means for applying a balanced force to said door comprises a support member connected to and extending across said vent frame, a first actuator arm pivoted to said support member, gear means for pivoting said arm with respect to said support member, and a second actuator arm pivoted at one end thereof to said first actuator arm and pivoted at the other end thereof to a centrally positioned point of said door.

9. A vehicle vent assembly comprising
a vent frame adapted to be secured in an opening of a vehicle wall,
a vent cover having a top, side walls, and a front wall,
means for mounting said vent cover front wall to said frame for motion of said vent cover from a first position in which said cover is seated in closed and sealed position upon said frame and a second position in which said cover is displaced from said frame with the rear portion of said cover and at least rear parts of the side walls of said cover spaced from said frame to provide ventilation passages between said frame and said cover at the rear and sides of said cover,
means for adjustably positioning said cover with respect to said frame to provide varying areas of said ventilation passages,
said cover front wall having a cover opening therein, a door,
means for mounting said door to said cover for motion between a first position in which it closes and seals said cover opening and a second position displaced from said cover opening, and means for adjustably positioning said door relative to said cover.

10. The apparatus of claim 9 including actuating means for forcibly driving said door to said first position to effect a forced sealing engagement of the door against the cover at said opening,
said door and cover opening including cooperating sealing means interengaged with said other when the door is in said closed position.

11. The apparatus of claim 9, wherein said cover is pivotally mounted to said frame, wherein said door is pivotally mounted to said cover, wherein said means for adjustably positioning said cover comprises first actuating means connected between said frame and said cover, and wherein said means for adjustably positioning said door comprises second actuating means connected between said frame and said door.

12. A vehicle vent assembly comprising
a vent frame adapted to be secured in the opening of a vehicle wall,
a vent cover having a top, side walls, and a front wall,
means for mounting said vent cover to said frame for motion from a first position in which said cover is seated in closed and sealed position upon said frame and a second position in which said cover is displaced from said frame with the rear portion of said cover and at least rear parts of the side walls of said cover spaced from said frame,
means for adjustably positioning said cover with respect to said frame,
said cover front wall havin a cover opening therein, a door,
means for mounting said door to said cover for motion between a first position in which it closes and seals said cover opening and a second position displaced from said cover opening,
means for adjustably positioning said door relative to said cover, said means for adjustably positioning said cover comprising a first actuator mechanism interconnected between said cover and said frame for moving and adjustably positioning said cover, said means for adjustably positioning said door comprising a second actuator mechanism interconnected between said door and said frame for adjustably moving and positioning said door, and
a screen connected with and extending across said frame, each said actuator mechanism comprising a handle member extending through said screen to permit operation of said mechanism at a side of said screen remote from said door and cover.

13. A vehicle vent assembly comprising
a frame adaped to be mounted to a ventilation opening in a vheicle,
a vent cover having a primary cover element, a front wall and side walls, said front wall being formed with a cover opening, said vent cover being pivotally mounted to said frame to displace the side walls and rear portion of said cover from said frame to provide ventilation passages between said frame and cover at said side walls and rear portion,
a door,
means for mounting said door to said vent cover for pivotal movement between a closed position in which the door closes and seals said vent cover opening and a second position in which the door is displaced from said opening,
actuator means for forcibly driving said door to said closed position, and means for holding said cover in different positions of pivotal motion relative to said frame.

14. A vehicle vent assembly comprising
a frame adapted to be mounted to a ventilation opening in a vehicle,
a vent cover mounted to said frame and having a primary cover element, a front wall and side walls, said front wall being formed with a cover opening, a door,
means for mounting said door to said vent cover for pivotal movement between a closed position in which the door closes and seals said vent cover opening and a second position in which the door is displaced from said opening,
actuator means for forcibly driving said door to said closed position,
a screen secured to and extending across said frame, said actuator means including a manual operating member extending through said screen to enable operation of said actuator means from a position on a side of said screen remote from said door and cover, said door including a forwardly extending peripheral lip that projects into said cover opening when said door is in said closed position, and a peripheral flange extending outwardly from an inner side of said lip to overlap the perimeter of said cover opening when said door is in said closed position, said actuator means including means for applying a balanced force to said door to drive said door flange against the cover at the periphery of said cover opening and to effect a tight sealing engagement between the door and the opening.

15. The apparatus of claim 14 including means mounting said cover to said frame for pivotal movement between a first position in which the cover is seated upon said frame in sealing relation thereto and a second position displaced from said frame, and further including a second actuator means for moving said cover to said first and second positions.

16. The aparatus of claim 15 wherein said second actuator means includes a manual operating member extending through said screen to permit operation of said actuating means from a position on a side of the screen remote from said cover.

17. The apparatus of claim 16 wherein said first mentioned actuator means comprises a support member fixed to and extending across said frame, a bell crank pivoted to said support member, an operating link having one end pivoted to said bell crank and another end pivoted to a central portion of said door, and means for rotating said bell crank.

18. The apparatus of claim 17 wherein said second actuator means comprises a second bell crank pivoted to said support member, a second operating link having one end connected to said second bell crank and the other end connected to said cover at a rear portion thereof, and means for rotating said second bell crank.

19. A vehicle ventilation assembly comprising
a ventilation frame having a frame opening,
a vent cover including a front wall having a cover opening therein,
means for pivotally mounting said cover at its front wall to said frame for motion between a closed position in which the cover closes said frame opening and an open position in which sides and the rear of the cover are pivotally displaced from said frame opening to provide ventilation passages between said cover and said frame at the rear and side of said frame,
a door,
means for pivotally mounting said door to said cover to close said cover opening, and
means for holding said door and cover in selected positions of their respective pivotal motion.

20. The assembly of claim 19 wherein said last mentioned means comprises first actuator means for positioning said cover relative to said frame and second actuator means independent of said first actuator means for positioning said door relative to said cover.

* * * * *